United States Patent [19]
Roth

[11] 3,857,983
[45] Dec. 31, 1974

[54] METHOD OF REMOVING NATURAL WAX FROM THE SKIN OF FRUITS AND VEGETABLES

[76] Inventor: Theodore L. Roth, P.O. Box 4810, San Jose, Costa Rica

[22] Filed: Sept. 25, 1972

[21] Appl. No.: 291,962

[52] U.S. Cl. ............... 426/287, 426/425, 426/429, 426/481, 134/11, 134/31
[51] Int. Cl. ............................................. A23l 1/00
[58] Field of Search ............ 99/100, 103, 576, 469, 99/534; 426/425, 429, 442, 479, 482, 481, 483, 506, 321, 331, 333, 287, 286; 134/105, 107, 109, 11, 12, 31

[56] References Cited
UNITED STATES PATENTS

| | | | |
|---|---|---|---|
| 1,884,966 | 10/1932 | Robinson | 99/103 |
| 2,270,642 | 1/1942 | Somes | 134/109 |
| 2,273,939 | 2/1942 | Dammers | 134/105 |
| 2,385,564 | 9/1945 | Booth | 134/109 |
| 3,169,564 | 2/1965 | Harrington | 99/103 |
| 3,460,990 | 8/1969 | Barday | 134/31 |
| 3,613,699 | 10/1971 | Holm | 134/015 |

*Primary Examiner*—Wilbur L. Bascomb, Jr.
*Assistant Examiner*—Martin G. Mullen
*Attorney, Agent, or Firm*—Roger B. Webster

[57] ABSTRACT

A commercial method of removing natural wax from the skin of certain fruits and vegetables (hereinafter called "the produce") which is an improvement over the general teachings of U.S. Pat. No. 3,169,564 under which applicant is licensed, and in which patent it is established that the removal of the wax from the skin of the produce can be accomplished by contacting the skin with a solvent such as a short carbon chain alcohol or low molecular weight ester thereof. The present method contemplates conveying of the produce through an enclosure, and—while therein—subjecting such produce to such a solvent in order to remove the natural wax from the skin.

2 Claims, 3 Drawing Figures

METHOD OF REMOVING NATURAL WAX FROM THE SKIN OF FRUITS AND VEGETABLES

BACKGROUND OF THE INVENTION

In the processing of certain fruits and vegetables (hereinafter called "the produce") preparatory to canning or freezing thereof, it is the practice to remove the skin, and one of the principal methods employed is a caustic (lye) bath. On certain waxy-skinned produce (for example, apples), the surface layer of natural wax on the skin impedes the caustic peeling operation. In broad theory, but without disclosure of any commercial method for its practice, U.S. Pat. No. 3,169,564 solved the problem by proposing that the skin of the produce be subjected to an alcohol solvent (or the equivalent) to remove the wax. The present invention was conceived in a successful effort to provide—over and above the teachings of such patent—an effective commercial method to so dewax the produce.

SUMMARY OF THE INVENTION

The present invention provides, as a major object, a novel method, for removing the natural wax from the skin of waxy-skinned produce, which comprises conveying the produce through an enclosure, and—while therein—subjecting the skin of the produce to a solvent (such as alcohol or the equivalent) to remove such wax; the alcohol being present in the enclosure and applied to the produce either in a vapor phase or a liquid phase, or both.

The present invention provides, as an additional important object, a method, as above, wherein—in a sequential operation—the produce in the enclosure is subjected to the alcohol solvent in one or both of said phases to strip the wax from the skin of such produce; the wax-bearing solvent is then recovered; and thereafter said recovered solvent is processed to remove the wax therefrom and for re-use of such solvent.

The present invention provides, as a still further object, a practical and reliable method of removing natural wax from the skin of waxy-skinned fruits and vegetables.

DESCRIPTION OF THE PREFERRED EMBODIMENT

Figure 1:
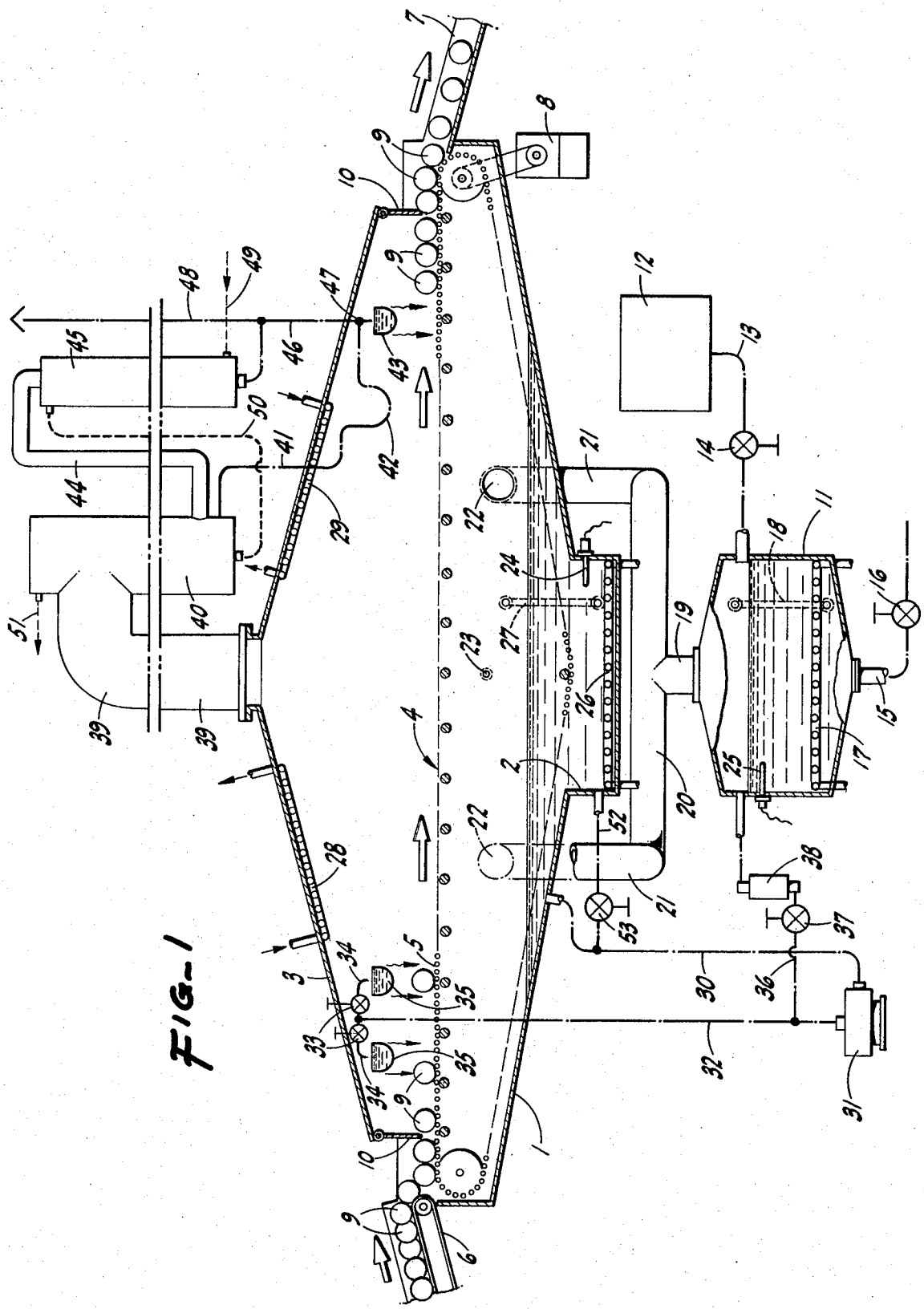
FIG. 1 is a diagrammatic elevation of one form of apparatus operative for the practice of the method of the present invention.
Figure 2:
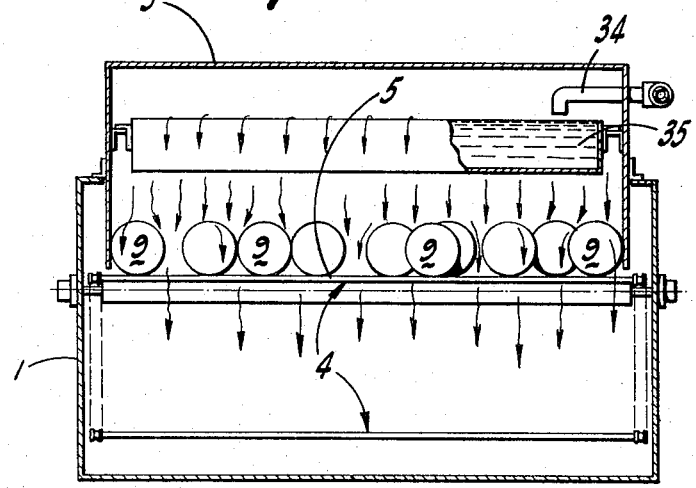
FIG. 2 is a transverse vertical sectional elevation taken through the conveyor-enclosing tank and hood assembly; the view including a disclosure of one of the solvent-distributing troughs.
Figure 3:
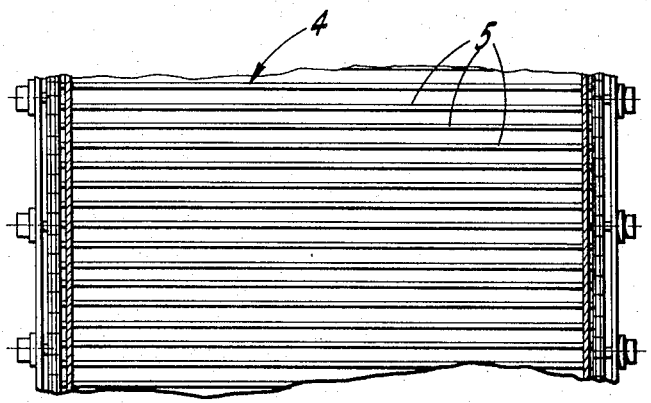
FIG. 3 is a fragmentary plan view of the upper run of the endless conveyor enclosed within the tank and hood assembly.

Referring now more particularly to the drawings and to the characters of reference marked thereon, the method of the present invention is practiced—by way of example—in apparatus which includes an elongated V-bottom tank 1 having a sump 2 therein centrally of its length; the tank 1 being encompassed by an elongated, inverter V-shaped hood 3 whereby said tank and hood provide an essentially closed zone.

An endless, open or foraminous conveyor, indicated generally at 4, is journaled in the tank 1 with the elongated, upper and horizontal run 5 of said conveyor 4 travelling—in the direction indicated—between an external produce-receiving conveyor 7; such conveyors 6 and 7 being disposed at opposite ends of the tank 1.

The endless conveyor 4 (while here shown of spaced rod type, but which may be of mesh type) is driven by a variable speed drive unit 8.

The produce 9 to be dewaxed is fed by the conveyor 6 onto the head end of the upper run 5 of conveyor 4, while—at the tail end of such upper run—the produce discharges therefrom to the receiving conveyor 7.

In order to assure that there is substantial closure at the ends of the tank and hood assembly in the area of the ends of the upper run 5 of conveyor 4, the hood 3 is provided—at its ends—with swingable curtains 10 which depend toward said upper run, but which curtains yield to permit movement thereby of the produce 9 onto—or from—said upper run.

A closed, solvent-vaporizing tank 11 is disposed below the sump 2; such tank 11 being initially filled to the desired level from a supply tank 12 by a connecting conduit 13 having a normally closed valve 14 therein. At the bottom, the tank 11 is fitted with a drain pipe 15 which includes a normally closed valve 16.

A heater 17, preferably a steam coil, is mounted in the lower portion of tank 11, and serves to heat and vaporize the solvent in such tank; the latter having a sight glass 18 thereon to permit of reading of the solvent level.

Solvent vapor, as produced in tank 11, rises in a stack 19 leading from tank 11 and connecting with a manifold 20 having spaced ducts 21 which feed the vapor into tank 1 through side ports 22 below the upper run 5 of conveyor 4.

A thermometer 23 leads into tank 1 adjacent but below said upper run 5; another thermometer 24 extends into sump 2; and a third thermometer 25 is mounted on tank 11.

A heater 26, preferably a steam coil, is mounted in the lower portion of sump 2, and a sight glass 27 is mounted so as to read the solvent level in tank 1 or said sump.

Prior to initiating operation of the conveyor 4 and movement of produce 9 through the dewaxing zone formed by tank 1 and hood 3, solvent in tank 11 is started to vaporize by the heater 17; the vapor delivering—by means of stack 19, manifold 20, and its ducts 21—into the tank 1 through ports 22. The solvent vapor, in the dewaxing zone, then thermally rises through the upper run 5 of conveyor 4, and a certain amount of such vapor condenses in said hood 3, falls—as a solvent condensate—back through such upper run 5, and gravitates to the bottom of tank 1 and into the sump 2. Such condensing of the vapor is enhanced by refrigerated "chill" coils 28 and 29 mounted in spaced relation in the hood 3 on the underside of the top thereof.

When a predetermined volume of condensed solvent accumulates in the bottom of tank 1 and sump 2, some of such condensed solvent is revaporized by heater 26, while other of the solvent—in liquid form—is drawn off and used as hereinafter described.

When the temperature in the apparatus, as reflected by the thermometers 23, 24, and 25, reaches (or is stabilized at) a predetermined value, the produce dewaxing operation is begun, with produce 9 being moved through the dewaxing zone by the upper run 5 of conveyor 4.

As the produce 9 is cold when it enters the dewaxing zone, the solvent vapor tends to condense on the produce as a dewaxing wash which tends to strip the natural wax from the skin of such produce. At the same time, condensed vapor descends from the chill coils 28 and 29 and falls on the produce as an additional solvent condensate wash, and hence supplements the dewaxing operation.

Such dewaxing operation is further supplemented as follows:

A quantity of the solvent in the bottom of tank 1 is continuously withdrawn through a conduit 30 leading to the intake of a pump 31 which delivers the solvent to a conduit 32; the latter, in turn, feeding through normally open valves 33 to spouts 34 which discharge into a pair of adjacent, horizontal, transversely extending solvent-distributing troughs 35 mounted in a position above the head portion of the upper run 5 of conveyor 4. The solvent continually overflows and falls from the lips of troughs 35; such solvent "falls" effectively wetting, as a further dewaxing wash, the produce 9 shortly after it enters the dewaxing zone.

The liquid solvent which falls from the troughs 35, as well as the solvent condensate produced in the dewaxing zone, gravitates, of course, to the bottom of the tank 1 and the sump 2 for re-use in the operating cycle.

In order to maintain the solvent in tank 11 at a proper level above the heater 26, a controlled amount of the solvent being withdrawn through conduit 30 by pump 31 and then fed through conduit 32, is bypassed by a conduit 36 leading from said conduit 32 to said tank 11; the conduit 36 having a valve 37 and an adjustable flowmeter 38 interposed therein in series.

The solvent vapor which does not condense within the assembly of tank 1 and hood 3 thermally rises in a stack 39, and thence delivers into a first water-cooled condenser 40; the liquid solvent (solvent condensate) produced in said condenser 40 being fed therefrom, by a conduit 41, through a trap 42, and thence to a horizontal, transversely extending solvent-distributing trough 43. The trough 43 is disposed above the tail end portion of the upper run 5 of conveyor 4, and—as it overflows at its lips—such trough 43 creates another solvent "falls" on the produce 9 and a dewaxing wash thereon just before the produce leaves the dewaxing zone and discharges to conveyor 7. This final wetting of the produce assures, effectively, of removal of any residual natural wax on the produce.

Any solvent vapor which does not condense in the first condenser 40 is carried by a transition duct 44 to a second, water-cooled condenser 45 from which solvent condensed therein is fed by a conduit 46 to connection with conduit 41 at a point 47 adjacent the trough 43, whereby to increase the volume of solvent condensate which said conduit 41 delivers to such trough.

A vent pipe 48 leads upward from conduit 46 ahead of connection point 47 in order to discharge to atmosphere any non-condensable vapors.

Counterflowing cooling water enters condenser 45 through a bottom pipe 49, then transfers in a pipe 50 from the top of condenser 45 to the bottom of condenser 40, and finally feeds out of the top of condenser 40 in a pipe 51.

The method, as above described, including the steps of subjecting the produce—moving in the dewaxing zone—to a solvent (such as alcohol) in both a vapor phase and a liquid phase, is an exceedingly effective, expeditious, and economical operation to accomplish removal of natural wax from the skin of waxy-skinned produce preparatory to lye-peeling of the latter.

After each run of the apparatus in the practice of the method, much of the then wax-laden solvent may be dewaxed and recovered, in the following manner, for re-use.

With valves 33 and 34 closed, the wax-laden solvent in the bottom of tank 1 and in sump 2 is drained, by pump 31, through the medium of conduit 30 and a lateral conduit 52 connected between said conduit 30 and the sump 2; such lateral conduit having a normally closed valve 53 therein, but which valve is opened for the above-mentioned draining purpose. From the pump 31, the drained, wax-laden solvent is delivered by conduits 32 and 36, through then-open valve 37 and flowmeter 38, to tank 11.

After the wax-laden solvent is thus drained and returned to tank 11, the valves 53 and 38 are closed and—by means of the heater 26—the solvent is vaporized, but the wax remains in said tank 11. The solvent vapor, as so produced, rises thermally, passes through and is reliquified in the condensers 40 and 45, is then delivered—as clean solvent—to and spills from the trough 43, and finally is received and temporarily retained in the bottom of tank 1 and in the sump 2. Thereafter, the wax sludge is drained from tank 11 through pipe 15, and such tank is suitably internally flushed and cleaned. When this has been accomplished, the clean solvent in tank 1 and sump 2 is pumped back to tank 11 preparatory to the next produce-dewaxing operation in the apparatus. If such clean solvent is of inadequate volume, it is supplemented from the supply tank 12.

From the foregoing description, it will be readily seen that there has been produced such a method as substantially fulfills the objects of the invention, as set forth herein.

Having thus described the method of the present invention, the following is claimed as new and useful and upon which Letters Patent is desired:

1. A method, of removing natural wax from the skin of waxy-skinned produce, comprising the steps of establishing an enclosure, introducing produce into the enclosure, subjecting the produce in said enclosure to a wax-removing solvent in an initially vapor phase, the vapor condensing in part in the enclosure as a solvent condensate and providing in such enclosure a dewaxing wash on the produce, withdrawing uncondensed vapor from the enclosure, condensing such withdrawn vapor exteriorly of the enclosure as a supplemental solvent condensate, and then feeding such supplemental solvent condensate to and discharging it in the enclosure above the produce to fall thereupon as an additional dewaxing wash.

2. A method, of removing natural wax from the skin of waxy-skinned produce, comprising the steps of establishing an enclosure having an apex, conveying the produce through the enclosure in a predetermined path below the apex, introducing a wax-removing solvent into the enclosure in a vapor phase below said path, the vapor rising in the enclosure and condensing in part as a solvent condensate on the produce as so conveyed and providing thereon a dewaxing wash, accumulating such solvent condensate below said path, feeding a portion of the accumulated solvent condensate to and discharging it in the enclosure above said path to fall on the conveyed produce as an additional dewaxing wash, subjecting the vapor in the enclosure to a cooling medium above said path whereby to cause other of the vapor to condense as a solvent condensate which descends upon the conveyed produce as a further dewaxing wash, withdrawing uncondensed vapor from the enclosure at the apex thereof, condensing such withdrawn vapor exteriorly of the enclosure as a supplemental solvent condensate, and then feeding such supplemental solvent condensate to and discharging it in the enclosure above said path to fall on the conveyed produce as another dewaxing wash, and accumulating below said path, with the solvent condensate which forms the first-named dewaxing wash, the solvent condensate which forms all of the other-named dewaxing washes.

* * * * *